(12) United States Patent
Stobbart

(10) Patent No.: US 8,657,145 B2
(45) Date of Patent: Feb. 25, 2014

(54) CAP FOR A PORT OF A PRESSURIZED CONTAINER OR CONDUIT

(75) Inventor: John Stobbart, West Glamorgan (GB)

(73) Assignee: Vector International Limited (GB)

( * ) Notice: Subject to any disclaimer, the term of this patent is extended or adjusted under 35 U.S.C. 154(b) by 564 days.

(21) Appl. No.: 12/432,940

(22) Filed: Apr. 30, 2009

(65) Prior Publication Data
US 2010/0276425 A1    Nov. 4, 2010

(51) Int. Cl.
*F17C 13/06*    (2006.01)

(52) U.S. Cl.
USPC ............ 220/582; 220/327; 220/240; 220/228

(58) Field of Classification Search
USPC .................................. 220/582, 327, 228, 240
See application file for complete search history.

(56) References Cited

U.S. PATENT DOCUMENTS

| | | | |
|---|---|---|---|
| 784,931 A * | 3/1905 | Duncan | 220/259.3 |
| 1,645,046 A | 10/1927 | Gallagher | |
| 2,483,156 A * | 9/1949 | Schmitz, Jr. | 220/240 |
| 3,042,248 A * | 7/1962 | Krueger | 220/240 |
| 4,230,325 A * | 10/1980 | Butler et al. | 277/622 |
| 5,056,678 A | 10/1991 | Grills et al. | |
| 5,622,098 A | 4/1997 | Piper | |
| 5,899,234 A | 5/1999 | Senninger | |
| 6,129,359 A | 10/2000 | Haas et al. | |
| 6,135,156 A | 10/2000 | Donoho et al. | |

FOREIGN PATENT DOCUMENTS

| | | |
|---|---|---|
| FR | 908602 | 4/1946 |
| GB | 771261 | 3/1957 |

OTHER PUBLICATIONS

European Search Report, Aug. 19, 2009, for Application No. EP 09 00 5823.

* cited by examiner

*Primary Examiner* — J. Gregory Pickett
*Assistant Examiner* — Blaine Neway
(74) *Attorney, Agent, or Firm* — Waddey & Patterson, P.C.; Emily A. Shouse

(57) ABSTRACT

A system for sealing an access port of a pressurized container or conduit comprises a metallic cap 10 having a sealing surface 20 which forms a seal with a corresponding sealing surface 16 of a metallic access port assembly 2, when the surfaces are pushed against each other by a clamping means 4 which is preferably separate from the cap. As shown the metal to metal sealing surfaces are frustro-conical in shape. The cap comprises a shoulder 26 which engages the rim of the access port if the cap is over tightened preventing deformation of the sealing surfaces. The cap may comprise a further frustro-conical sealing surface 40 which co acts with a corresponding surface 46 on an insert 6 which fits within and rests upon an internal shoulder 18 of the access port assembly 2 which may be welded onto a container.

6 Claims, 1 Drawing Sheet

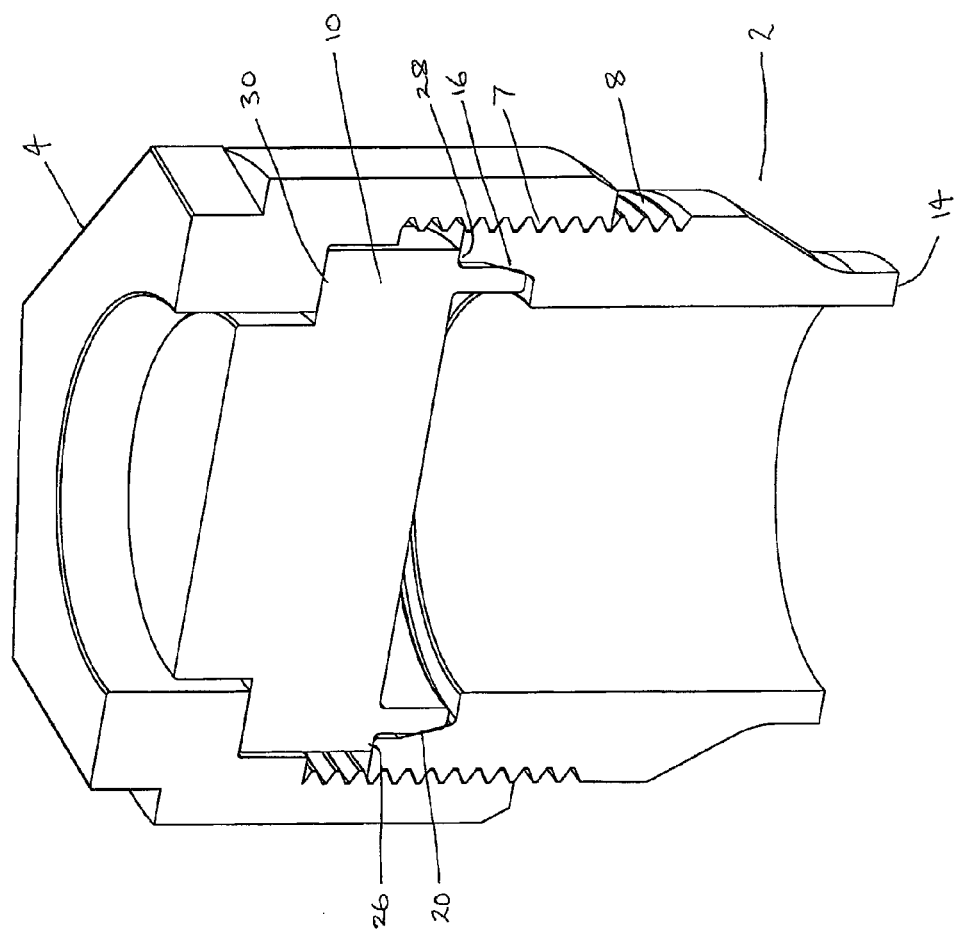

CAP FOR A PORT OF A PRESSURIZED CONTAINER OR CONDUIT

BACKGROUND OF THE INVENTION

The present invention relates to a cap for sealing a port of a pressurized container or conduit, in particular for sealing a port of a pressured vessel.

In a wide variety of applications of pressurized containers or conduits, it is necessary to have a port through which material may be added or removed from the container or conduit as required. It will be appreciated that in a pressurized container or conduit, any closing system to a port must be have high seal integrity in order that the pressure within the container may be withstood without leakage occurring. Traditionally this has been achieved through welding a cap onto the opening of the port, the cap being subsequently removed by cutting and a new cap welded about the opening.

The present invention provides an improved arrangement.

BRIEF SUMMARY OF THE INVENTION

According to the present invention there is system for sealing an access port of a container or conduit, the container or conduit arranged to withstand an above atmosphere pressure environment, the system comprising an access port assembly having a sealing surface portion arranged to be mated with a cap, and a cap having a sealing surface portion arranged to co-operate with the sealing surface portion of the access port assembly, and a clamping means arranged and configured to cause the sealing surface portion of the cap to be pushed against the surface portion of the access port assembly providing a seal therebetween, wherein access port assembly and the cap are constructed of a metallic material.

There are numerous benefits associated with the present invention, such as ease of sealing a port, re-sealing ability, consistent performance and reduced chance of ingress of foreign particles through cutting off a cap.

The cap and clamp are preferably separate components.

In one embodiment, the access port assembly may be integral with a pressure vessel, however, it is envisaged that the assembly may be welded to the container and/or conduit.

The sealing surface portion of the access port assembly is preferably tapered. Even more preferably, the tapered sealing surface portion of the access port assembly is frustro-conical.

The sealing surface portion of the cap is preferably tapered, and is even more preferably frustro-conical.

The access port assembly preferably comprises a neck having an outer surface, a shoulder portion, and the sealing surface portion, wherein at least part of the cap is arranged to nest in the access port assembly. The neck preferably includes securing means for enabling the clamping means to releasably connect thereto.

The securing means may comprise a thread onto which a corresponding thread of the clamping means locates.

The clamping means is arranged to releasably provide a force axially onto the cap. The clamping means includes a shoulder portion arranged to provide a force onto a corresponding shoulder portion on the cap assembly.

The present invention will now be described by way of example only with reference to the accompanying drawing.

BRIEF DESCRIPTION OF THE DRAWINGS

FIG. 1 is a schematic perspective view of an arrangement according to an exemplary embodiment of the present invention, wherein the arrangement has been cut longitudinally to clearly identify the relevant components.

DETAILED DESCRIPTION OF THE INVENTION

Referring to FIG. 1, there is provided an access port assembly 2 and a clamping arrangement 4. The clamping arrangement 4 may comprise an inner threaded portion 7 which mates onto a corresponding threaded portion 8 of the access port assembly 2. The clamping arrangement 4 may be configured to be rotated through known tooling such as a spanner and accordingly may have a plurality of planer faces thereby enabling engagement with a spanner. It will be appreciated that six planer faces have been indicated in the drawings, however, any suitable number may be utilized.

The access port assembly 2 comprises a rim 14 which can be welded onto the opening in the vessel or conduit to be pressurized. In an alternative embodiment the access port assembly 2 may be formed integrally with the pressurized container or conduit.

The access port assembly comprises a sealing surface 16 against which the seal is formed with the cap 10. The sealing surface 16 is tapered and is beneficially frustro-conical and decreases in diameter in the direction into the container or conduit when the assembly is in use. The outer surface of the access port assembly 2 comprises of a threaded portion arranged to mate with the clamping portion 4.

The cap 10 is indicated which is arranged to co-act with the access port assembly 2 to provide a seal. The cap 10 comprises a sealing surface 20 which communicates with the sealing surface 16 of the access port assembly 2. The sealing surface 20 is preferably tapered and preferably comprises of frustro-conical configuration. The angle of the taper from the vertical orientation may generally correspond to the angle of the sealing surface 16 of the access port assembly 2. Even more beneficially, the angle of the sealing surface 20 is less than the angle of the sealing surface 16 of the access port assembly 2. Examples of suitable angles may be 15 degrees from the vertical (axial length) for the access port assembly 2 and the angle of the sealing surface 20 of the cap 10 may be 13.6 degrees from the vertical (axial length). A minor difference in angles enables an improved seal to be achieved. Once the cap 10 is nested into the access port assembly 2, the sealing surfaces 16 and 20 cooperate to form a seal therebetween. Optionally, the surfaces may have a coating thereon, for example, to act as a lubricant. The cap 10 advantageously comprises a shoulder 26 which in normal use will not come into contact with the upper rim 28 of the access port assembly 2. This shoulder 26 is present such that in the event of excess torque being applied to the clamping arrangement 4 then excess deformation of the portion of the cap 10 comprising the sealing surface 20 will not occur as the shoulder 26 contacts the access port assembly 2 preventing further deformation. A further shoulder 30 is provided on the opposing surface of the cap 10 which is arranged to communicate with the clamping arrangement 4 to compress the cap 10 into the access port assembly 2. The communication of the clamping arrangement 4 with the cap 10 causes the mating of the sealing surfaces 16 and 20 and thus provides the seal.

The clamping arrangement 4 has been shown in an exemplary embodiment including an internal thread which mates with the corresponding thread 32 on the outer surface of the access port assembly 2. It will be appreciated by a person skilled in the art that numerous clamping arrangements may be provided in order to provide the axial force onto the cap 10. It will be appreciated that when the clamping arrangement 4 is tightened, the specific torque must be adhered to provide the optimum sealing performance.

A coating may be provided on the seals and any other aspects of the components. Providing a lubricant seal on the tapered portions ensures that the best possible seal is achieved and enables the clamping means to be released and the cap removed a number of times as required. Preferred materials for production of the cap and access port assembly is stainless steel is utilized which exhibits good properties for the purpose. The cap may be made of a different metallic material and in one embodiment may be made of a sacrificial material that can be replaced as and when required.

Benefits of the present invention are significant as the cap 10 includes a seal which interacts with the access port assembly 2. Such a component is relatively small and is less costly to manufacture and may optionally be re-machined if damage occurs in use. In use currently whereby caps are welded onto the rim of the aperture and then cut when access is required, there is a high chance of ingress into the container or conduit of foreign matter and as such the present invention overcomes such problems. It should be noted that the examples of specific applications may be reactor tubes or heat exchanger tubes. A further advantage over the provision of a clamping arrangement, cap and seal is that the seal and cap are combined thereby removing a leakage flow path.

The present invention has been described by way of example only and it will be appreciated by a person skilled in the art that modifications and variations may be made to the invention without departing from the scope of protections afforded by the appended claims.

What is claimed is:

1. A system for sealing a port of a container, wherein the container is configured to hold an above-atmosphere pressure fluid, the system comprising:
    an integral access port assembly having an axis therethrough, said access port assembly comprising:
        a lower rim connected to the port of the container;
        an upper rim axially opposite the lower rim;
        a threaded portion of an outer surface of the access port assembly;
        a sealing surface having an inner diameter, wherein the inner diameter near the lower rim is less than the inner diameter near the upper rim; and
    a cap comprising:
        a sealing surface operable to engage the sealing surface of the access port assembly to provide a seal therebetween, sealing the port of the container via a single leakage path;
        a longitudinal recess radially inward of the sealing surface of the cap;
        a first shoulder extending radially outward of the sealing surface of the cap, wherein the first shoulder is operable to engage the upper rim of the access port assembly and limit travel of the cap into the access port assembly, preventing deformation of the sealing surface of the access port assembly and sealing surface of the cap; and
        a second shoulder extending axially from the first shoulder, the second shoulder opposing the first shoulder; and
    a clamping arrangement operable to axially force the sealing surface of the cap into the access port assembly, the clamping arrangement comprising:
        a threaded portion on an inner surface of the clamping arrangement, wherein the threaded portion of the clamping arrangement is operable to engage the threaded portion of the access port assembly; and
        a shoulder portion operable to engage the second shoulder of the cap and push the sealing surface of the cap against the sealing surface of the access port assembly.

2. The system of claim 1, wherein the container is a conduit operable to contain an above-atmosphere pressure fluid or a pressure vessel operable to contain an above-atmosphere pressurized fluid.

3. The system of claim 1, wherein an angle of the sealing surface of the cap with respect to the axis is less than an angle of the sealing surface of the access port assembly with respect to the axis.

4. The system of claim 1, wherein:
    the sealing surface of the access port assembly and the sealing surface of the cap are frustro-conical in shape;
    the sealing surface of the cap is operable to nest inside the sealing surface of the access port assembly; and
    and the sealing surface of the cap is deflected radially inward when pressed into the sealing surface of the access port assembly.

5. The system of claim 1, wherein the lower rim of the access port assembly is welded to the port of the container.

6. The system of claim 1, wherein the sealing surface of the access port assembly and the sealing surface of the cap are metallic.

* * * * *